(12) United States Patent
Musha et al.

(10) Patent No.: US 12,315,050 B2
(45) Date of Patent: May 27, 2025

(54) IMAGE PROCESSING METHOD, IMAGE DISPLAYING METHOD, IMAGE PROCESSING DEVICE, AND IMAGE DISPLAYING DEVICE

(71) Applicant: Nissan Motor Co., Ltd., Yokohama (JP)

(72) Inventors: Yusuke Musha, Kanagawa (JP); Yasuhiro Suzuki, Kanagawa (JP); Muku Takeda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/713,054

(22) PCT Filed: Nov. 29, 2021

(86) PCT No.: PCT/JP2021/043651
§ 371 (c)(1),
(2) Date: May 23, 2024

(87) PCT Pub. No.: WO2023/095340
PCT Pub. Date: Jun. 1, 2023

(65) Prior Publication Data
US 2025/0022194 A1 Jan. 16, 2025

(51) Int. Cl.
*G06T 11/20* (2006.01)
*B60R 1/26* (2022.01)
*G06T 7/73* (2017.01)

(52) U.S. Cl.
CPC ............. *G06T 11/203* (2013.01); *B60R 1/26* (2022.01); *G06T 7/73* (2017.01);
(Continued)

(58) Field of Classification Search
CPC ............. G06T 11/203; G06T 7/73; G06T 2207/30261; B60R 1/26; B60R 2300/105; B60R 2300/30; B60R 2300/20
See application file for complete search history.

(56) References Cited

U.S. PATENT DOCUMENTS 9,106,842 B2 * 8/2015 Sumi ............... H04N 23/90
10,857,942 B2 12/2020 Oba
(Continued)

FOREIGN PATENT DOCUMENTS

JP 2019-101879 A 6/2019
JP 2019-202584 A 11/2019
(Continued)

*Primary Examiner* — Phi Hoang
(74) *Attorney, Agent, or Firm* — Young Basile Hanlon & MacFarlane, P.C.

(57) ABSTRACT

An image processing method includes: capturing, by a first image capturing device installed at a position located on a side surface outside a vehicle interior of a vehicle and anterior to a rear end of the vehicle, a first image, the first image being an image of a region including a rear lateral side of the vehicle; capturing, by a second image capturing device installed on a rear end of the vehicle, a second image, the second image being an image of a region in a rear of the vehicle; generating a synthetic image serving as an image of a rear view of the vehicle by synthesizing the first image and the second image with each other; and superimposing an outline, the outline being a line segment extending along a contour of a side surface of the vehicle, in the synthetic image.

7 Claims, 5 Drawing Sheets

(52) U.S. Cl.
CPC ..... *B60R 2300/105* (2013.01); *B60R 2300/20* (2013.01); *B60R 2300/30* (2013.01); *G06T 2207/30261* (2013.01)

(56) References Cited

U.S. PATENT DOCUMENTS

| | | | |
|---|---|---|---|
| 10,965,872 | B2 | 3/2021 | Asai et al. |
| 11,807,062 | B2 * | 11/2023 | Lazarevski ........... G06T 19/006 |
| 2014/0046503 | A1 * | 2/2014 | Mulder ................. B62D 6/002 |
| | | | 701/1 |
| 2016/0044284 | A1 * | 2/2016 | Goseberg ............. H04N 23/698 |
| | | | 348/148 |
| 2019/0174065 | A1 | 6/2019 | Asai et al. |
| 2019/0248288 | A1 | 8/2019 | Oba |
| 2020/0059609 | A1 | 2/2020 | Tsutsumitake |
| 2021/0081684 | A1 * | 3/2021 | Yamamoto ................ B60R 1/28 |
| 2021/0287335 | A1 * | 9/2021 | Goto ......................... G06T 3/00 |

FOREIGN PATENT DOCUMENTS

| | | |
|---|---|---|
| WO | 2016/088151 A1 | 6/2016 |
| WO | 2018/012299 A1 | 1/2018 |

\* cited by examiner

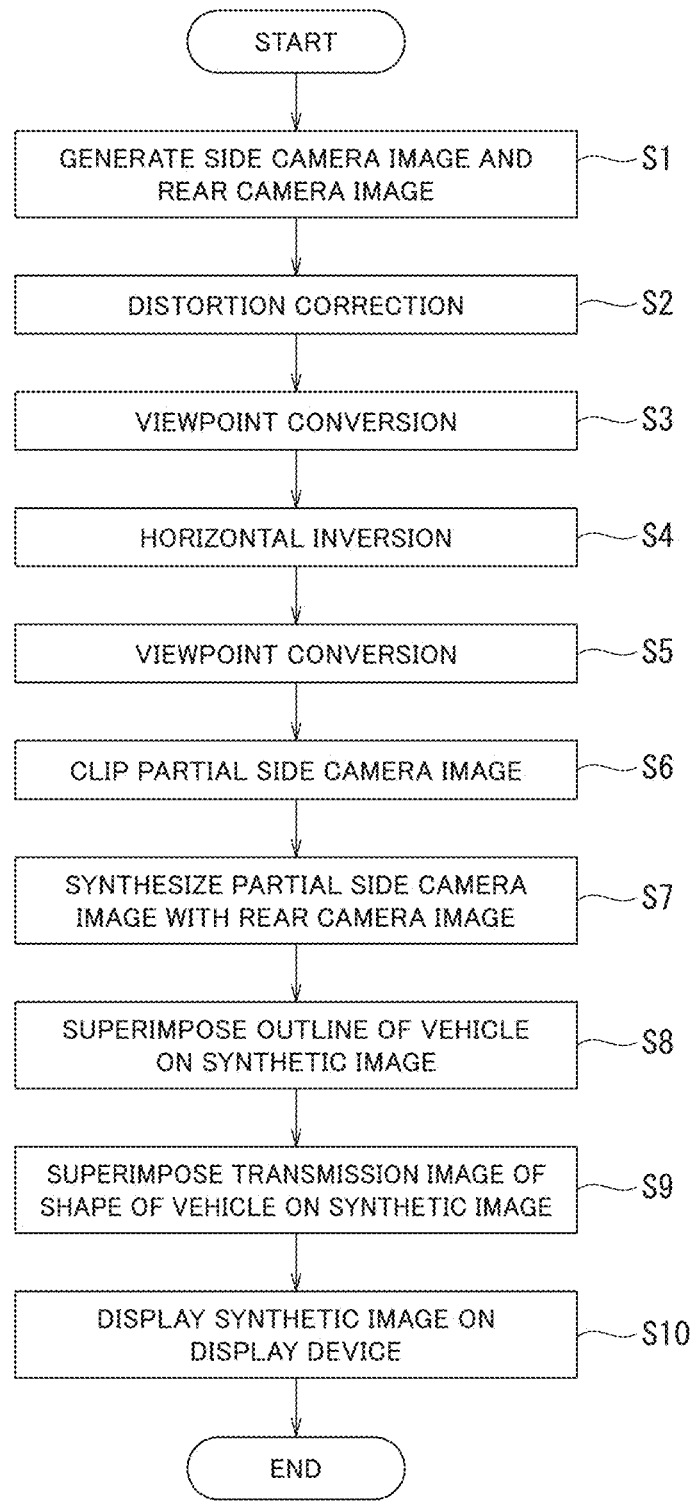

IMAGE PROCESSING METHOD, IMAGE DISPLAYING METHOD, IMAGE PROCESSING DEVICE, AND IMAGE DISPLAYING DEVICE

TECHNICAL FIELD

The present invention relates to an image processing method, an image displaying method, an image processing device, and an image displaying device.

BACKGROUND

In JP 2019-101879 A described below, an image displaying device configured to generate a synthetic image obtained by synthesizing an image of a rear region of a vehicle with an image of a region on the rear lateral side of the vehicle and display the generated synthetic image on a display device is described.

SUMMARY

However, there has been a problem in that when a driver operates a vehicle and parks the vehicle, it is difficult to grasp a relative positional relationship between the vehicle and an ambient object from a synthetic image generated in JP 2019-101879 A described above and as a result, it is difficult to park the vehicle while seeing the synthetic image.

An object of the present invention is to facilitate grasping a relative positional relationship between a vehicle and an ambient object from an image in which a rear lateral side of the vehicle is captured.

According to an aspect of the present invention, there is provided an image processing method including: capturing, by a first image capturing device installed at a position located on a side surface outside a vehicle interior of a vehicle and anterior to a rear end of the vehicle, a first image, the first image being an image of a region including a rear lateral side of the vehicle; capturing, by a second image capturing device installed on a rear end of the vehicle, a second image, the second image being an image of a region in a rear of the vehicle; generating a synthetic image serving as an image of a rear view of the vehicle by synthesizing the first image and the second image with each other; and superimposing an outline, the outline being a line segment extending along a contour of a side surface of the vehicle, in the synthetic image.

According to another aspect of the present invention, there is provided an image displaying method including displaying the synthetic image generated by the image processing method described above and on which the outline is superimposed, on a display device in a vehicle interior of the vehicle.

According to an aspect of the present invention, it is possible to facilitate grasping a relative positional relationship between a vehicle and an ambient object from a synthetic image in which a rear lateral side of the vehicle is captured.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 6 is a flowchart of an example of an image displaying method of the embodiment.

DETAILED DESCRIPTION (Configuration)

Figure 1:
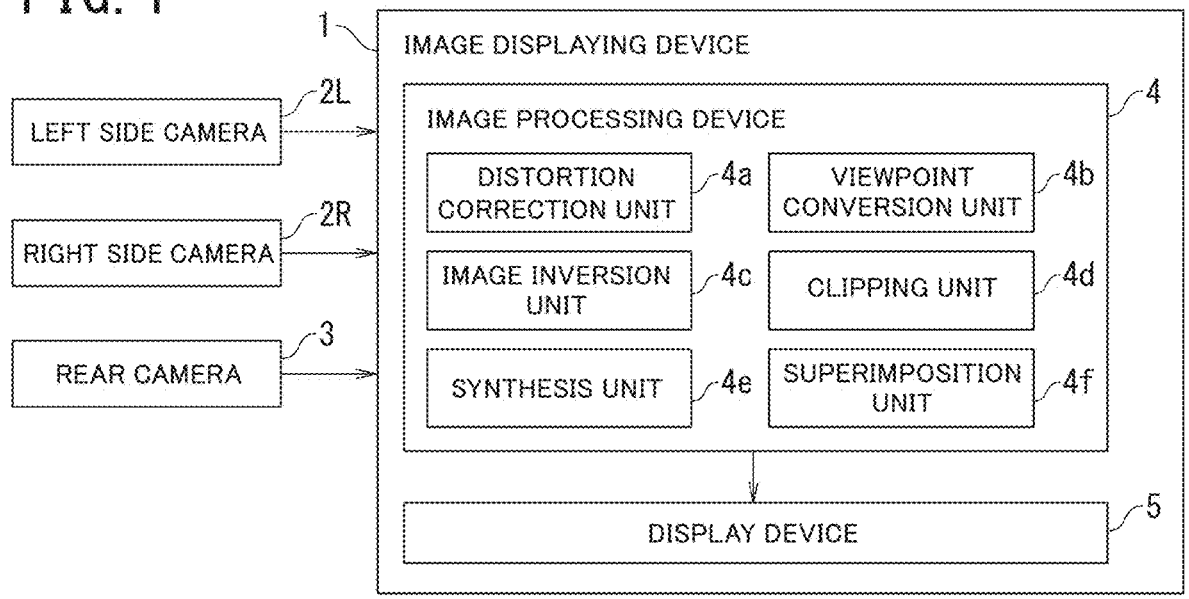
FIG. 1 is a schematic configuration diagram of an example of an image displaying device of an embodiment.

FIG. 1 is a schematic configuration diagram of an example of an image displaying device of an embodiment. An image displaying device 1 is mounted on a vehicle 10 in conjunction with a left side camera 2L, a right side camera 2R, and a rear camera 3. For example, the image displaying device 1 may be an electronic circuit including a processor (such as a CPU and an MPU) and a storage device (such as a semiconductor storage device, a magnetic storage device, and an optical storage device). The image displaying device 1 may achieve information processing, which will be described below, by the processor executing computer programs stored in the storage device.

Figure 2A:
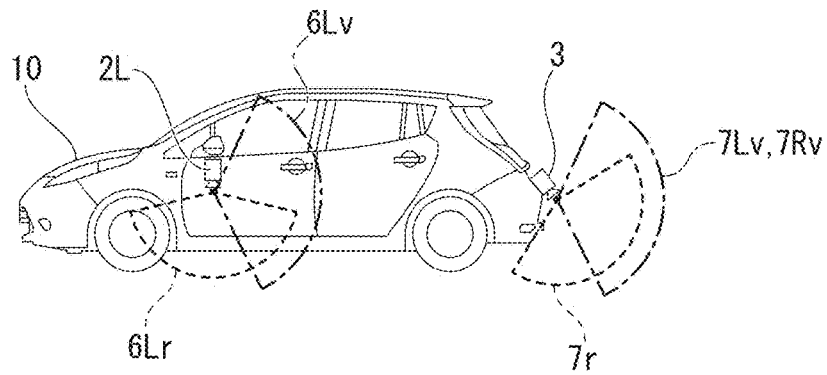
FIG. 2A is a schematic diagram of attachment positions and ranges of angles of view of a left side camera, a right side camera, and a rear camera and ranges of angles of view of images after viewpoint conversion.
Figure 2B:
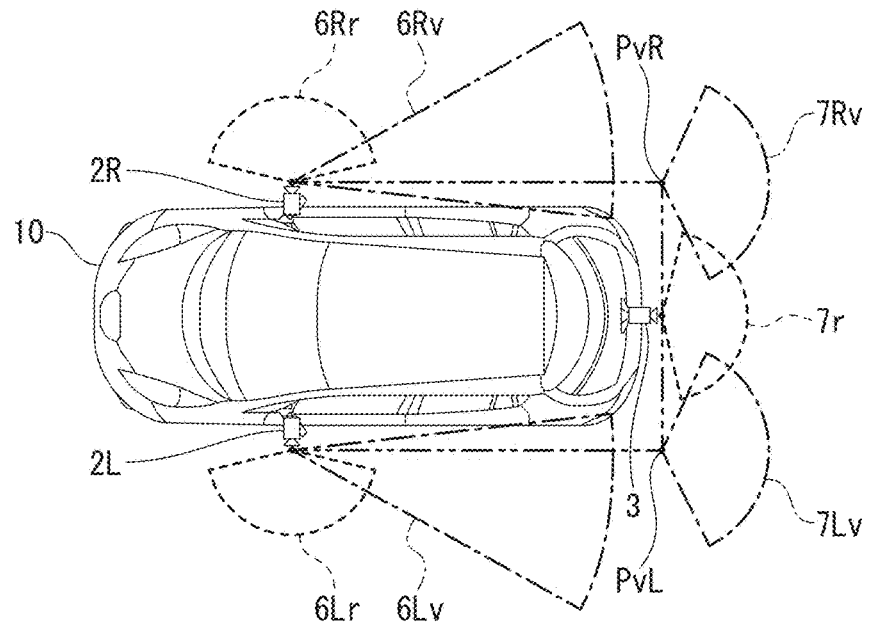
FIG. 2B is another schematic diagram of the attachment positions and the ranges of the angles of view of the left side camera, the right side camera, and the rear camera and the ranges of the angles of view of the images after viewpoint conversion.

As illustrated in FIGS. 2A and 2B, the left side camera 2L is installed at a position located on a left side surface outside a vehicle interior and anterior to a rear end of the vehicle 10, and generates a "left side camera image" that is an image in which a region including a rear lateral side on the left-hand side of the vehicle is captured. In addition, the right side camera 2R is installed at a position located on a right side surface outside the vehicle interior and anterior to the rear end of the vehicle 10, and generates a "right side camera image" that is an image in which a region including a rear lateral side on the right-hand side of the vehicle is captured. For example, the left side camera 2L and the right side camera 2R are attached to the underside of side mirrors on the left-hand side and the right-hand side, respectively.

In addition, the rear camera 3 is installed on the rear end of the vehicle 10 and generates a "rear camera image" that is an image in which a region in the rear of the vehicle is captured. For example, the rear camera 3 is attached to a position on the upper side of a rear license plate.

For example, dashed lines 6Lr, 6Rr, and 7r in FIGS. 2A and 2B schematically illustrate ranges of angles of view of the left side camera 2L, the right side camera 2R, and the rear camera 3, respectively.

Optical axes of the left side camera 2L and the right side camera 2R are perpendicular to the longitudinal direction of the vehicle 10 and are directed obliquely left downward and obliquely right downward, respectively. Angles formed by the optical axes and the horizontal directions may be, for example, 45 degrees.

In addition, an optical axis of the rear camera 3 is directed rearward of the vehicle 10 and obliquely downward, and an angle formed by the optical axis and the horizontal direction may be, for example, 45 degrees.

The angles of view of the left side camera 2L, the right side camera 2R, and the rear camera 3 may be, for example, approximately 180 degrees (for example, approximately 185 degrees). That is, the left side camera 2L, the right side camera 2R, and the rear camera 3 may be wide angle cameras equipped with fisheye lens having a wide angle of view. For example, the left side camera 2L, the right side camera 2R, and the rear camera 3 may be around view monitoring cameras that generate an image to be converted to a bird's eye view (an around view monitoring image).

FIG. 1 is now referred to. The image displaying device 1 includes an image processing device 4 and a display device 5.

The image processing device 4, by subjecting a left side camera image, a right side camera image, and a rear camera image that the left side camera 2L, the right side camera 2R, and the rear camera 3 generated, respectively to image processing, generates a "left rear lateral side synthetic image" that is an image of a rear lateral side region on the left-hand side of the vehicle 10 and a "right rear lateral side synthetic image" that is an image of a rear lateral side region on the right-hand side of the vehicle 10.

The display device 5 is installed in the vehicle interior of the vehicle 10 and displays the left rear lateral side synthetic image and the right rear lateral side synthetic image that are generated by the image processing device 4, on a display screen.

The image processing device 4 will be described in detail below. The image processing device 4 includes a distortion correction unit 4a, a viewpoint conversion unit 4b, an image inversion unit 4c, a clipping unit 4d, a synthesis unit 4e, and a superimposition unit 4f.

The distortion correction unit 4a corrects distortions included in a left side camera image, a right side camera image, and a rear camera image that are generated by the left side camera 2L, the right side camera 2R, and the rear camera 3, which are wide angle cameras, respectively.

Figure 3A:
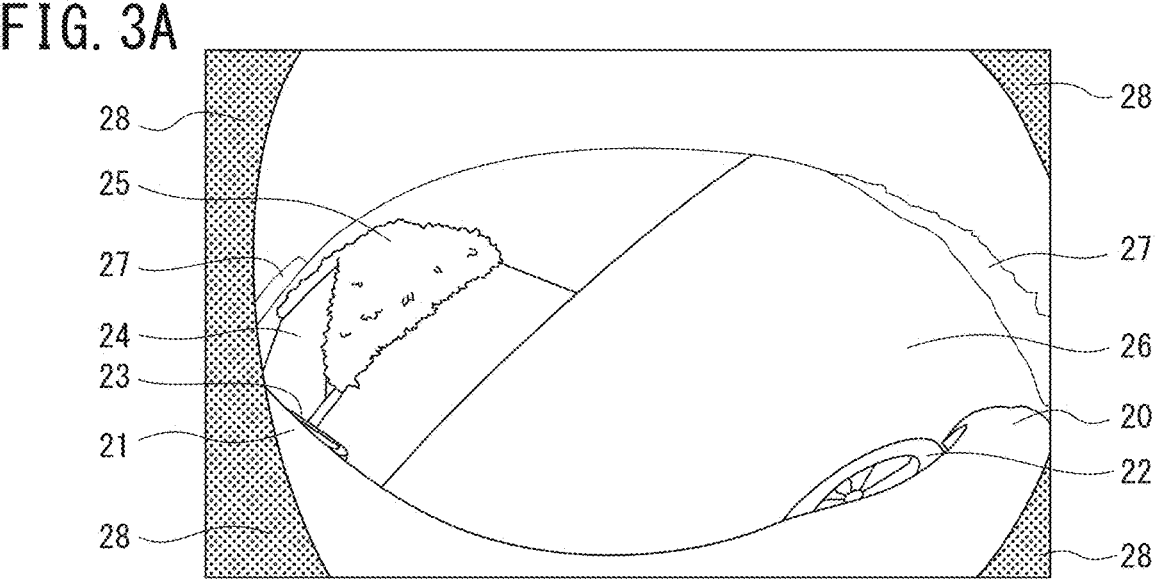
FIG. 3A is a schematic diagram of a left side camera image.

FIG. 3A is a schematic diagram of a left side camera image before distortion correction, which is performed by the distortion correction unit 4a. In portions indicated by reference signs 20, 21, 22, and 23, a side surface of a left front end portion, a side surface of a left rear portion, a left front wheel, and a left rear wheel of the vehicle 10 are captured, respectively. In addition, in a portion indicated by a reference sign 24, a parking space behind the vehicle 10 is captured, and in a portion indicated by a reference sign 25, plants around the parking space 24 are captured. In a portion indicated by a reference sign 26, a road around the vehicle 10 is captured, and in a portion indicated by a reference sign 27, plants growing along the road are captured.

In addition, regions 28 indicated by comparatively dark dot hatchings are a region in which a component around an installation site of the left side camera 2L is captured and a region outside an image circle of an optical system of the left side camera 2L.

Since as illustrated in FIG. 3A, distortion occurs in a captured image captured by the left side camera 2L, the right side camera 2R, or the rear camera 3, which are wide angle cameras, the distortion correction unit 4a corrects distortion caused by a wide-angle lens.

The viewpoint conversion unit 4b, by subjecting a left side camera image to viewpoint conversion processing, generates a virtual viewpoint image in which a sight line direction is directed rearward of the vehicle 10 and horizontally with a position of the left side camera 2L defined as a viewpoint. In addition, the viewpoint conversion unit 4b, by subjecting a right side camera image to the viewpoint conversion processing, generates a virtual viewpoint image in which the sight line direction is directed rearward of the vehicle 10 and horizontally with a position of the right side camera 2R defined as a viewpoint.

Dashed-dotted lines 6Lv and 6Rv in FIGS. 2A and 2B schematically illustrate ranges of angles of view of a left side camera image and a right side camera image after viewpoint conversion, respectively.

Figure 3B:
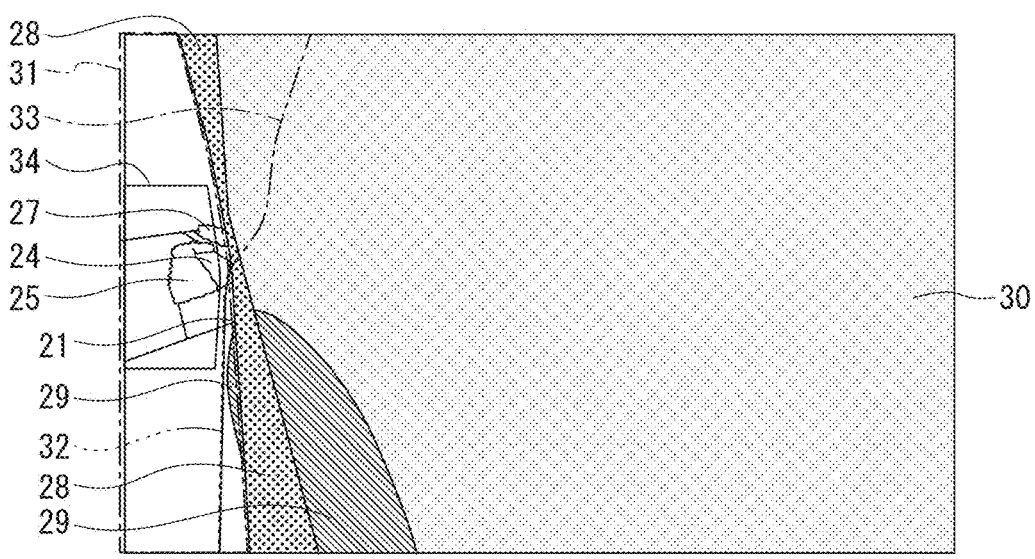
FIG. 3B is a schematic diagram of a left side camera image after being subjected to distortion correction, viewpoint conversion processing, and horizontal inversion processing.

The image inversion unit 4c horizontally inverts the left side camera image after viewpoint conversion. FIG. 3B is a schematic diagram of a left side camera image after being subjected to the distortion correction, the viewpoint conversion processing, and the horizontal inversion processing.

The regions 28 indicated by a comparatively dark dot hatching are a region in which a component around the installation site of the left side camera 2L is captured and a region outside the image circle of the optical system of the left side camera 2L. A region 29 indicated by a shaded hatching is a region including pixels within a range that is not included in the left side camera image before viewpoint conversion. In addition, although a region 30 indicated by a comparatively light dot hatching corresponds to a portion other than the region on the left rear lateral side of the vehicle 10 within the left side camera image before viewpoint conversion in FIG. 3A, illustration thereof will be omitted herein for convenience of description.

In an image region 31 in FIG. 3B, an image in which the region on the left rear lateral side of the vehicle 10 is captured is generated. In the example in the schematic diagram in FIG. 3B, the side surface 21 of the left rear portion of the vehicle 10, the parking space 24, the plants 25 and 27 are captured in the image region 31.

In addition, a dashed line 32 in FIG. 3B indicates a position of a contour (outside line) of the vehicle 10 that is actually captured in the left side camera image. In addition, the dashed-dotted line 33 indicates a position at which another contour (outside line) of the vehicle 10 that, although not being actually captured in the left side camera image, should be captured in an image having the same sight line direction and angle of view as the left side camera image after viewpoint conversion.

Figure 3C:
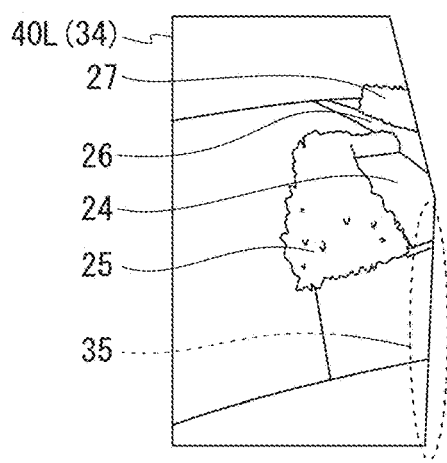
FIG. 3C is a schematic diagram of a partial left side camera image that is clipped from the left side camera image in FIG. 3B.

The clipping unit 4d clips a region 34 that is a portion of the image region 31 in the left side camera image after being subjected to the viewpoint conversion processing and the horizontal inversion processing, as a "partial left side camera image". The partial left side camera image is synthesized with the rear camera image, as will be described later. FIG. 3C is a schematic diagram of a partial left side camera image 40L that is clipped from the left side camera image in FIG. 3B.

For example, the clipping unit 4d may clip, among pixels included in the image region 31, pixels within a range on the outer side in the image lateral direction of positions at which pixels representing the contour of the vehicle 10 should be displayed (in the example in FIG. 3B, positions of the dashed line 32 and the dashed-dotted line 33) in the image having the same sight line direction and angle of view as the left side camera image after viewpoint conversion, as the partial left side camera image. A portion 35 of the edge (boundary) of the partial left side camera image may coincide with the contour (dashed line 32) that is actually captured in the left side camera image after viewpoint conversion.

The viewpoint conversion unit 4b and the image inversion unit 4c likewise also perform the viewpoint conversion processing and the horizontal inversion processing on the right side camera image. In addition, the clipping unit 4d clips a "partial right side camera image" from the right side camera image after being subjected to the viewpoint conversion processing and the horizontal inversion processing.

Figure 4A:
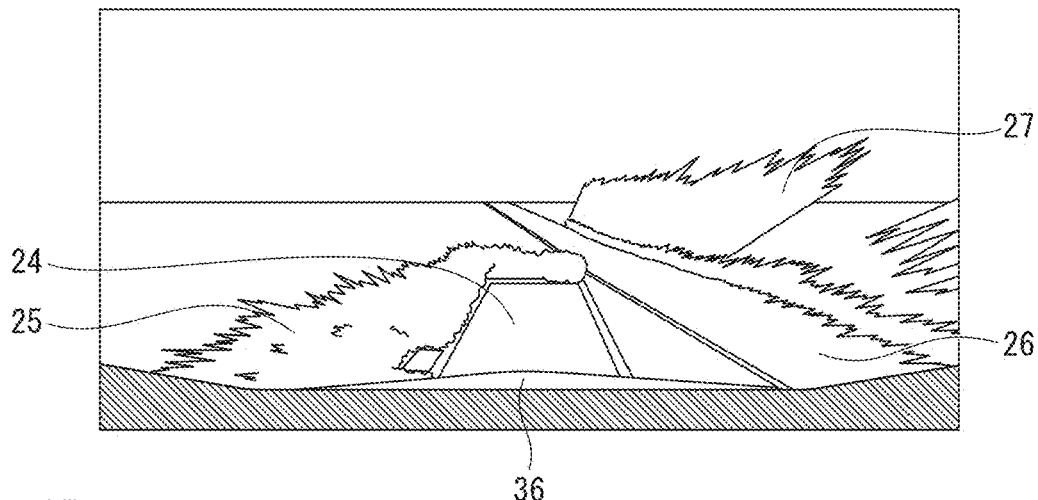
FIG. 4A is a schematic diagram of a rear camera image after being subjected to the distortion correction, the viewpoint conversion processing, and the horizontal inversion processing.

On the other hand, the viewpoint conversion unit 4b, by subjecting the rear camera image to the viewpoint conversion processing, generates a virtual viewpoint image in which a sight line direction is directed rearward of the vehicle 10 and horizontally with the position of the rear camera 3 defined as a viewpoint. The image inversion unit 4c horizontally inverts a rear camera image after viewpoint conversion. FIG. 4A is a schematic diagram of a rear camera image after being subjected to the distortion correction, the viewpoint conversion processing, and the horizontal inversion processing. In the rear camera image, the parking space 24, the plants 25 and 27, and the road 26 are captured. In a portion indicated by a reference sign 36, a rear bumper of the vehicle 10 is captured.

Further, the viewpoint conversion unit 4b, by subjecting the rear camera image in FIG. 4A to the viewpoint conversion processing, generates a virtual viewpoint image (hereinafter, referred to as a "left-hand side rear camera image") that is obtained by moving a virtual viewpoint of the rear camera image to a lateral direction position corresponding to a vehicle width direction position of the left side camera 2L.

Likewise, the viewpoint conversion unit 4b, by subjecting the rear camera image in FIG. 4A to the viewpoint conversion processing, generates a virtual viewpoint image (hereinafter, referred to as a "right-hand side rear camera image") that is obtained by moving the virtual viewpoint of the rear camera image to a lateral direction position corresponding to a vehicle width direction position of the right side camera 2R.

Figure 4B:
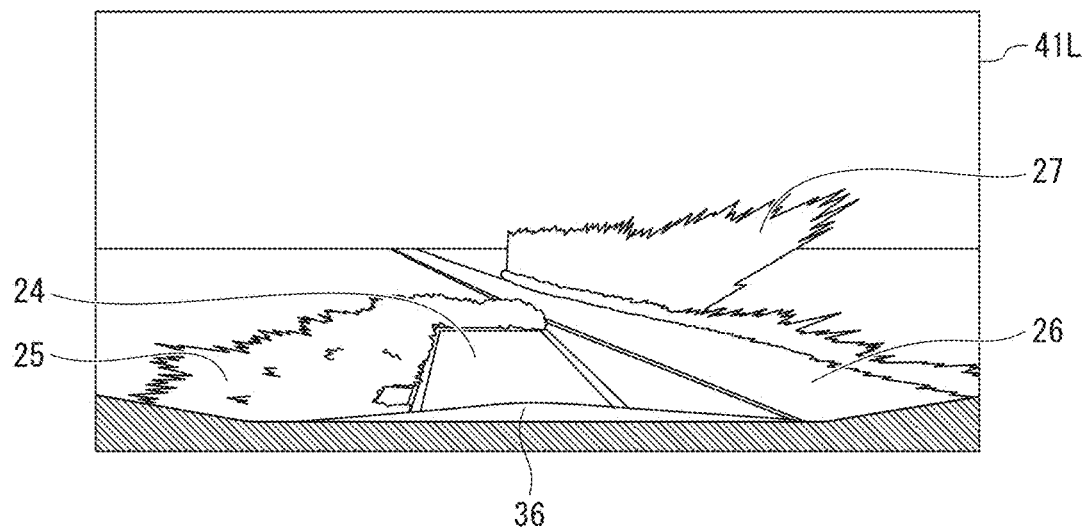
FIG. 4B is a schematic diagram of a left-hand side rear camera image that is obtained by moving a virtual viewpoint of the rear camera image to a lateral direction position corresponding to a vehicle width direction position of the left side camera.
Figure 4C:
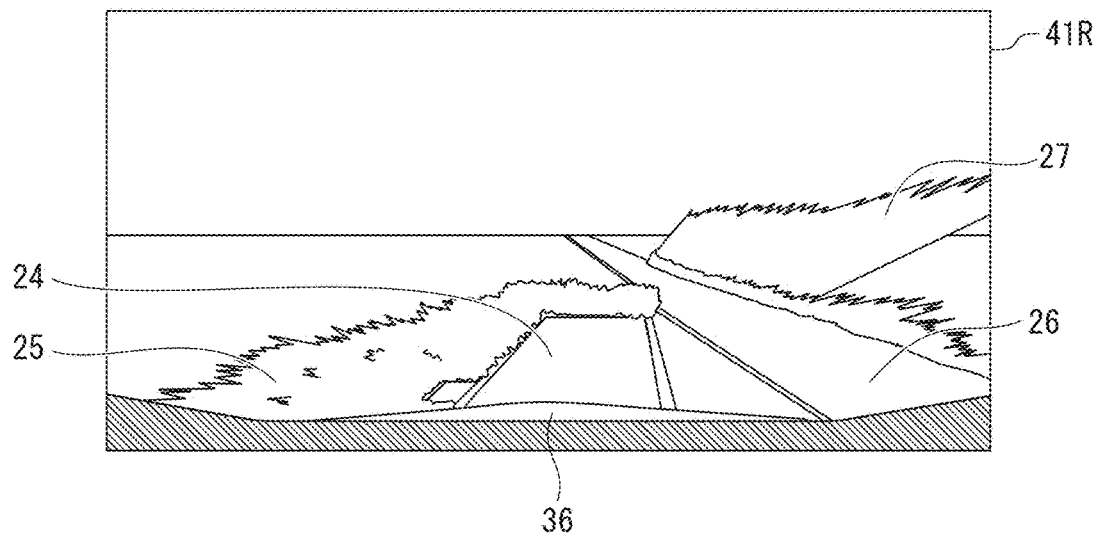
FIG. 4C is a schematic diagram of a right-hand side rear camera image that is obtained by moving the virtual viewpoint of the rear camera image to a lateral direction position corresponding to a vehicle width direction position of the right side camera.

FIGS. 2A and 2B schematically illustrate virtual viewpoints PvL and PVR of the left-hand side rear camera image and the right-hand side rear camera image and ranges 7Lv and 7Rv of angles of view. FIGS. 4B and 4C are schematic diagrams of a left-hand side rear camera image 41L and a right-hand side rear camera image 41R, respectively. Moving a position of the virtual viewpoint of the rear camera image in this way facilitates synthesis of the partial left side camera image clipped from the left side camera image and the partial right side camera image clipped from the right side camera image with the rear camera image.

FIG. 1 is now referred to. The synthesis unit 4e generates a synthetic image obtained by synthesizing the partial left side camera image 40L with the left-hand side rear camera image 41L. The left-hand side rear camera image 41L with which the partial left side camera image 40L is synthesized is hereinafter sometimes referred to as a "left rear lateral side synthetic image 41L".

Figure 5A:
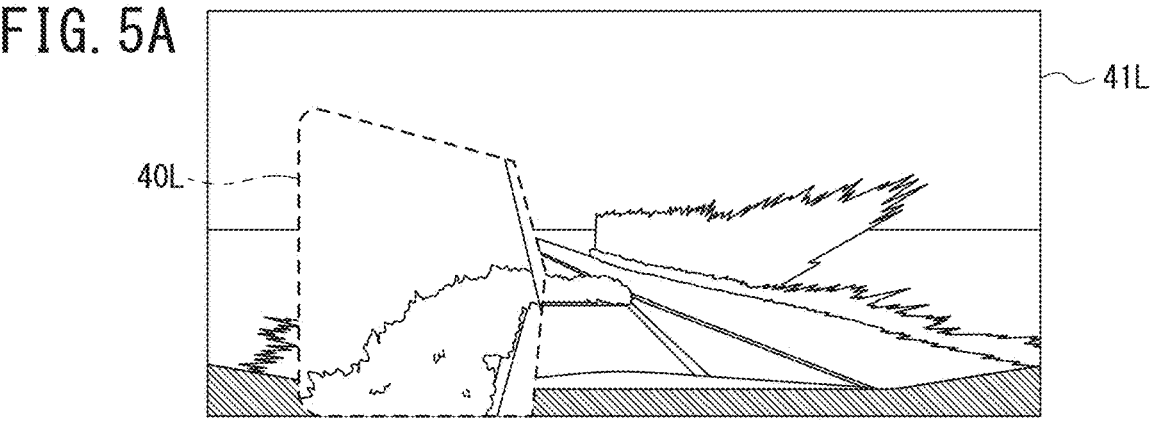
FIG. 5A is a schematic diagram of a left rear lateral side synthetic image obtained by synthesizing the partial left side camera image with the left-hand side rear camera image.

FIG. 5A is a schematic diagram of the left rear lateral side synthetic image 41L. For example, the synthesis unit 4e, by replacing pixels within a range that the angle of view of the partial left side camera image 40L occupies within the region of the left-hand side rear camera image 41L by the partial left side camera image 40L, synthesizes the left-hand side rear camera image 41L and the partial left side camera image 40L with each other.

Figure 5B:
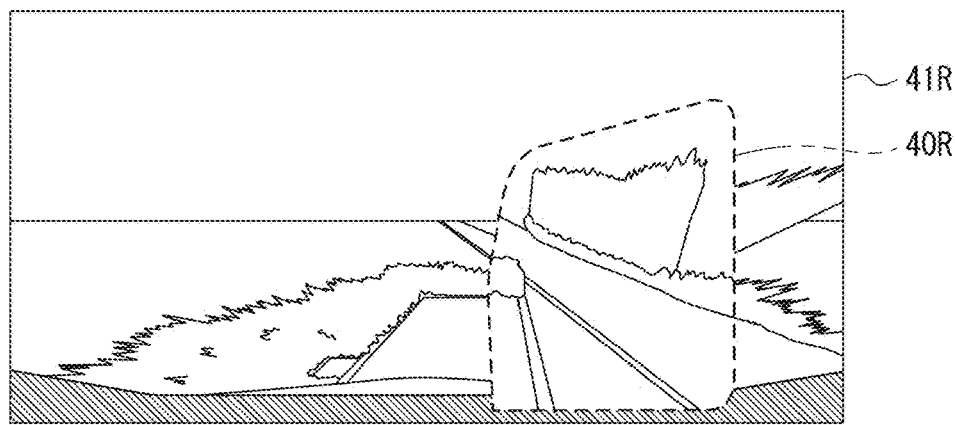
FIG. 5B is a schematic diagram of a right rear lateral side synthetic image obtained by synthesizing a partial right side camera image with the right-hand side rear camera image.

FIG. 5B is now referred to. Likewise, the synthesis unit 4e generates a synthetic image obtained by synthesizing the partial right side camera image 40R with the right-hand side rear camera image 41R. The right-hand side rear camera image 41R with which the partial right side camera image 40R is synthesized is hereinafter sometimes referred to as a "right rear lateral side synthetic image 41R".

FIG. 1 is now referred to. The superimposition unit 4f superimposes outlines that are lines extending along the contour of the vehicle 10, on the left rear lateral side synthetic image 41L and the right rear lateral side synthetic image 41R.

Figure 5C:
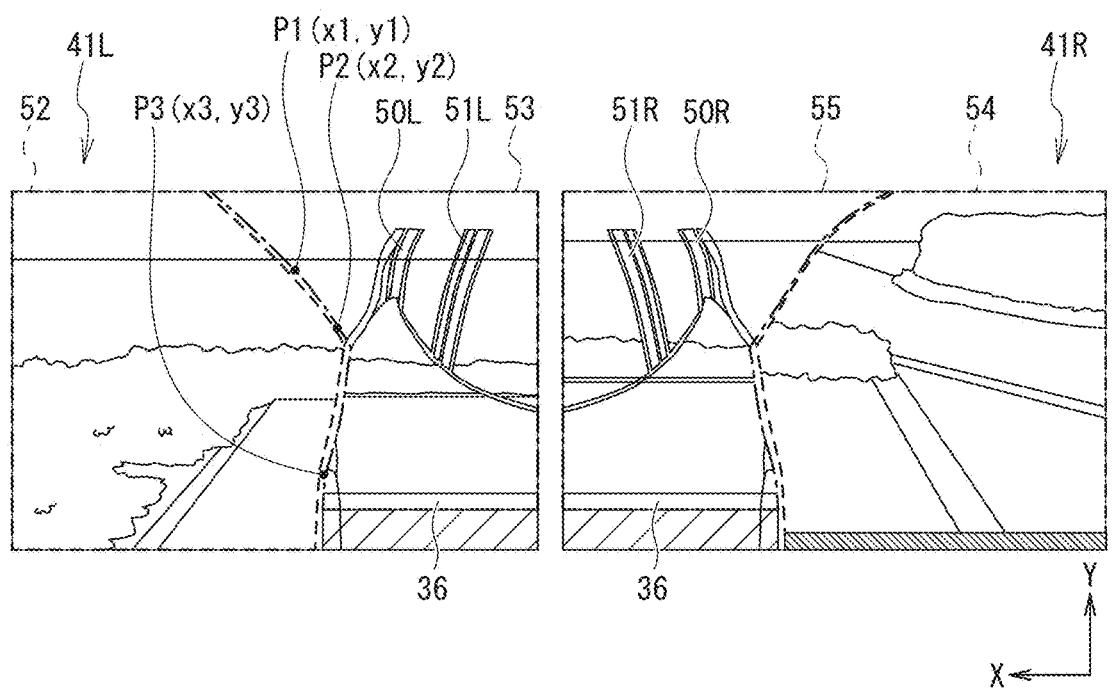
FIG. 5C is schematic diagrams of synthetic images on which an outline and a transmission image of the vehicle are superimposed.

FIG. 5C is schematic diagrams of the left rear lateral side synthetic image 41L and the right rear lateral side synthetic image 41R on which the outlines of the vehicle 10 are superimposed. Note that the lateral direction and the vertical direction of the left rear lateral side synthetic image 41L and the right rear lateral side synthetic image 41R are defined as an "X-direction" and a "Y-direction", respectively.

The superimposition unit 4f superimposes an outline 50L that is a line segment extending along the contour of the left side surface of the vehicle 10, on the left rear lateral side synthetic image 41L. A position at which the outline 50L is superimposed on the left rear lateral side synthetic image 41L may, for example, be determined by calculating in advance a position at which the contour of the vehicle 10 is captured when an image covering a range that is captured in the left rear lateral side synthetic image 41L with the position of the left side camera 2L defined as a viewpoint is generated.

In addition, the superimposition unit 4f may detect the contour (the dashed line 32) of the vehicle 10 that is actually captured in the left side camera image as illustrated in FIG. 3B. The superimposition unit 4f may determine a position at which the outline 50L is superimposed in such a way that the outline 50L becomes a line segment extending along the contour of the vehicle 10, based on a position at which the partial left side camera image 40L is synthesized with the left rear lateral side synthetic image 41L and a position of the contour detected from the left side camera image.

The superimposition unit 4f further superimposes a transmission image 51L of the shape of the vehicle 10 in a region on the inner side in the image lateral direction (the X-direction) of the outline 50L within the left rear lateral side synthetic image 41L.

Likewise, the superimposition unit 4f also superimposes an outline 50R that is a line segment extending along the contour of the right side surface of the vehicle 10 and a transmission image 51R of the shape of the vehicle 10, on the right rear lateral side synthetic image 41R.

Note that a range enclosed by a dashed line 52 in the left rear lateral side synthetic image 41L is an image region that includes pixels extracted from the partial left side camera image 40L, and a range enclosed by a dashed-dotted line 53 is an image region that includes pixels extracted from the left-hand side rear camera image 41L in FIG. 4B.

In addition, a range enclosed by a dashed line 54 in the right rear lateral side synthetic image 41R is an image region that includes pixels extracted from the partial right side camera image 40R, and a range enclosed by a dashed-dotted line 55 is an image region that includes pixels extracted from the right-hand side rear camera image 41R illustrated in FIG. 4C.

Coordinates P1, P2, and P3 on a boundary line between the image region 52 and the image region 53 will be given attention. Y-direction positions (that is, vertical direction positions) of the coordinates P1, P2, and P3 are y1, y2, and y3, respectively, and X-direction positions (that is, lateral direction positions) of the coordinates P1, P2, and P3 are x1, x2, and x3, respectively.

In the left rear lateral side synthetic image 41L, among pixels located at the Y-direction position y1, pixels in a region on the outer side in the X-direction of the X-direction position x1 are extracted from the partial left side camera image 40L and pixels in a region on the inner side of the X-direction position x1 are extracted from the left-hand side rear camera image 41L.

Likewise, among pixels located at the Y-direction position y2, pixels in a region on the outer side of the X-direction position x2 are extracted from the partial left side camera image 40L and pixels in a region on the inner side of the X-direction position x2 are extracted from the left-hand side rear camera image 41L. Among pixels located at the Y-direction position y3, pixels in a region on the outer side of the X-direction position x3 are extracted from the partial left side camera image 40L and pixels in a region on the inner side of the X-direction position x3 are extracted from the left-hand side rear camera image 41L. Each of the X-direction positions x1, x2, and x3 of the coordinates P1, P2, and P3 is an example of a "predetermined lateral direction position" described in the claims.

As described above, the partial left side camera image 40L is a partial image that is extracted from the left side camera image after viewpoint conversion by clipping pixels in a range on the outer side of the contour of the vehicle 10.

Thus, at the Y-direction positions y1 and y2, the X-direction positions x1 and x2 are positions on the outer side of the outline 50L, which extends along the contour of the vehicle 10, in the vehicle width direction (the image lateral direction) of the vehicle 10.

In addition, as illustrated in FIG. 3C, the portion 35 within the edge of the partial left side camera image 40L may coincide with the contour (the dashed line 32) that is actually captured in the left side camera image after viewpoint conversion. Thus, the X-direction position x3 of the boundary line between the image region 52 and the image region 53 at the Y-direction position y3 may be the same as the position of the outline 50L.

FIG. 1 is now referred to. The superimposition unit 4f outputs the left rear lateral side synthetic image 41L and the right rear lateral side synthetic image 41R on which the outlines 50L and 50R of the vehicle 10 and the transmission images 51L and 51R are superimposed, to the display device 5.

The display device 5 displays the left rear lateral side synthetic image 41L and the right rear lateral side synthetic image 41R on the display screen in the vehicle interior of the vehicle 10. For example, the display device 5 may display an image of a region behind the vehicle 10, such as the rear camera image in FIG. 4A, in such a manner as to interposing the image between the left rear lateral side synthetic image 41L and the right rear lateral side synthetic image 41R. As illustrated in FIG. 5C, the display device 5 may display the left rear lateral side synthetic image 41L and the right rear lateral side synthetic image 41R side by side.

(Operation)

FIG. 6 is a flowchart of an example of an image displaying method of the embodiment.

In step S1, the left side camera 2L, the right side camera 2R, and the rear camera 3 generates a left side camera image, a right side camera image, and a rear camera image, respectively.

In step S2, the distortion correction unit 4a corrects distortions included in the left side camera image, the right side camera image, and the rear camera image.

In step S3, the viewpoint conversion unit 4b, by subjecting the left side camera image and the right side camera image to the viewpoint conversion processing, generates virtual viewpoint images in which the sight line direction is directed rearward of the vehicle 10 and horizontally with the positions of the left side camera 2L and the right side camera 2R defined as viewpoints, respectively. In addition, the viewpoint conversion unit 4b, by subjecting the rear camera image to the viewpoint conversion processing, generates a virtual viewpoint image in which the sight line direction is directed rearward of the vehicle 10 and horizontally with the position of the rear camera 3 defined as a viewpoint.

In step S4, the image inversion unit 4c horizontally inverts the left side camera image, the right side camera image, and the rear camera image after viewpoint conversion.

In step S5, the viewpoint conversion unit 4b, by subjecting the rear camera image after the horizontal inversion processing to the viewpoint conversion processing, generates a left-hand side rear camera image and a right-hand side rear camera image that are obtained by moving the virtual viewpoints PvL and PvR to lateral direction positions corresponding to the vehicle width direction positions of the left side camera 2L and the right side camera 2R, respectively.

In step S6, the clipping unit 4d clips a partial left side camera image 40L in which a region on the left rear lateral side is captured, from the left side camera image after being subjected to the horizontal inversion processing in step S4. Likewise, the clipping unit 4d clips a partial right side camera image 40R in which a region on the right rear lateral side is captured from the right side camera image after being subjected to the horizontal inversion processing in step S4.

In step S7, the synthesis unit 4e generates a left rear lateral side synthetic image 41L obtained by synthesizing the partial left side camera image 40L with the left-hand side rear camera image and a right rear lateral side synthetic image 41R obtained by synthesizing the partial right side camera image 40R with the right-hand side rear camera image.

In step S8, the superimposition unit 4f superimposes the outlines 50L and 50R of the vehicle 10 on the left rear lateral side synthetic image 41L and the right rear lateral side synthetic image 41R, respectively.

In step S9, the superimposition unit 4f superimposes the transmission images 51L and 51R of the shape of the vehicle 10 on the left rear lateral side synthetic image 41L and the right rear lateral side synthetic image 41R, respectively.

In step S10, the display device 5 displays the left rear lateral side synthetic image 41L and the right rear lateral side synthetic image 41R on which the outlines 50L and 50R and the transmission images 51L and 51R of the shape of the vehicle 10 are superimposed, respectively, on the display screen in the vehicle interior of the vehicle 10. Subsequently, the process terminates.

(Advantageous Effects of Embodiment)

(1) The left side camera 2L and the right side camera 2R that are installed at positions located on the side surfaces outside the vehicle interior and anterior to the rear end of the vehicle 10 capture first images that are images of regions including rear lateral sides of the vehicle 10. The rear camera 3 that is installed on the rear end of the vehicle 10 captures a second image that is an image of a region in the rear of the vehicle 10. The image processing device 4 generates synthetic images serving as images of rear views of the vehicle by synthesizing the first images and the second image with each other and superimposes outlines that are line segments extending along the contours of the side surfaces of the vehicle 10 in the synthetic images.

Because of this configuration, it becomes easier to grasp a relative positional relationship between the vehicle 10 and an ambient object from the synthetic image in which a rear lateral side of the vehicle 10 is captured. In addition, it is possible to, by synthesizing the first images captured by the left side camera 2L and the right side camera 2R, which are installed at positions located anterior to the rear end of the vehicle 10, with the second image, generate a synthetic image in which an object existing on the lateral side of the vehicle 10 that is not captured in the second image captured by the rear camera 3 is captured.

(2) The image processing device 4 may, within a synthetic image, extract an image of a region on the outer side of a predetermined lateral direction position in the lateral direction of the synthetic image from the first image and extract an image of a region on the inner side of the predetermined lateral direction position from the second image. The predetermined lateral direction position may include a position on the outer side of a line segment extending along the contour of the vehicle 10 in the image lateral direction.

Because of this configuration, it is possible to generate a synthetic image in which not only regions on the rear lateral sides that are captured in the first images captured by the left side camera 2L and the right side camera 2R but also regions that are hidden by the vehicle body from the left side camera 2L and the right side camera 2R are captured.

(3) The predetermined lateral direction position is set with respect to each vertical direction position in a synthetic image, and one or more of the predetermined lateral direction positions may be the same as one or more respective positions on the outline.

Because of this configuration, it is possible to generate a synthetic image in which a region extending to an area close to the side surface of the vehicle 10 is captured.

(4) The image processing device 4 may detect the contour of the vehicle 10 from the first image. The outline to be superimposed in a synthetic image may be a line segment extending along the contour of the vehicle 10 that is detected from the first image.

Because of this configuration, it is possible to determine a position at which the outline is superimposed on the synthetic image, according to a position of the contour of the vehicle 10 that is actually captured in the first image.

(5) The image processing device 4 may superimpose a transmission image of the shape of the vehicle 10 in a region on the inner side in the image lateral direction of the outline within a synthetic image.

Because of this configuration, it become easier to grasp the outline in the synthetic image.

(6) The display device 5 may display a synthetic image that is generated by the image processing device 4 and on which the outline is superimposed, on a display device in the vehicle interior of the vehicle 10. Because of this configuration, the occupant of the vehicle 10 can easily grasp a relative positional relationship between an ambient object on the rear lateral side of the vehicle 10 and the vehicle 10.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

REFERENCE SIGNS LIST

1 Image displaying device
2L Left side camera
2R Right side camera
4 Image processing device
4a Distortion correction unit
4b Viewpoint conversion unit
4c Image inversion unit
4d Clipping unit
4e Synthesis unit
4f Superimposition unit
5 Display device

The invention claimed is:

1. An image processing method comprising:
capturing, by a first image capturing device installed at a position located on a side surface outside a vehicle interior of a vehicle and anterior to a rear end of the vehicle, a first image, the first image being an image of a region including a rear lateral side of the vehicle;
capturing, by a second image capturing device installed on a rear end of the vehicle, a second image, the second image being an image of a region in a rear of the vehicle;
generating a synthetic image serving as an image of a rear view of the vehicle by synthesizing the first image and the second image with each other; and
superimposing an outline, the outline being a line segment extending along a contour of a side surface of the vehicle, in the synthetic image, wherein
the image processing method, within the synthetic image, extracts an image of a region on an outer side of a predetermined lateral direction position in a lateral direction of the synthetic image from the first image and extracts an image of a region on an inner side of the predetermined lateral direction position in the lateral direction from the second image, and
the predetermined lateral direction position is set with respect to each vertical direction position in the synthetic image and one or more of the predetermined lateral direction positions is same as one or more respective positions on the outline.

2. The image processing method according to claim 1, wherein the predetermined lateral direction position includes a position on an outer side of a line segment extending along a contour of the vehicle in the lateral direction.

3. The image processing method according to claim 1, wherein
the image processing method detects a contour of the vehicle from the first image, and
the outline to be superimposed in the synthetic image is a line segment extending along a contour of the vehicle detected from the first image.

4. The image processing method according to claim 1, wherein the image processing method superimposes a transmission image of a shape of the vehicle in a region on an inner side in an image lateral direction of the outline within the synthetic image.

5. An image displaying method comprising
displaying the synthetic image generated by the image processing method according to claim 1, and on which the outline is superimposed, on a display device in a vehicle interior of the vehicle.

6. An image processing device configured to execute processing comprising:
generating a synthetic image as an image of a rear view of a vehicle by synthesizing a first image, the first image being an image of a region including a rear lateral side of a vehicle, captured by a first image capturing device installed at a position located on a side surface outside a vehicle interior of the vehicle and anterior to a rear end of the vehicle, with a second image, the second image being an image of a region in a rear of the vehicle, captured by a second image capturing device installed on a rear end of the vehicle; and
superimposing an outline, the outline being a line segment extending along a contour of a side surface of the vehicle, in the synthetic image, wherein
the image processing device, within the synthetic image, extracts an image of a region on an outer side of a predetermined lateral direction position in a lateral direction of the synthetic image from the first image and extracts an image of a region on an inner side of the predetermined lateral direction position in the lateral direction from the second image, and
the predetermined lateral direction position is set with respect to each vertical direction position in the synthetic image and one or more of the predetermined lateral direction positions is same as one or more respective positions on the outline.

7. An image displaying device comprising:
the image processing device according to claim 6; and
a display screen configured to display the synthetic image generated by the image processing device and on which the outline is superimposed, in a vehicle interior of the vehicle.

* * * * *